Sept. 11, 1928.  1,684,354
P. LIEBERGELD
MECHANICAL TIME FUSE WITH CLOCKWORK
Filed Oct. 6, 1927   2 Sheets-Sheet 1
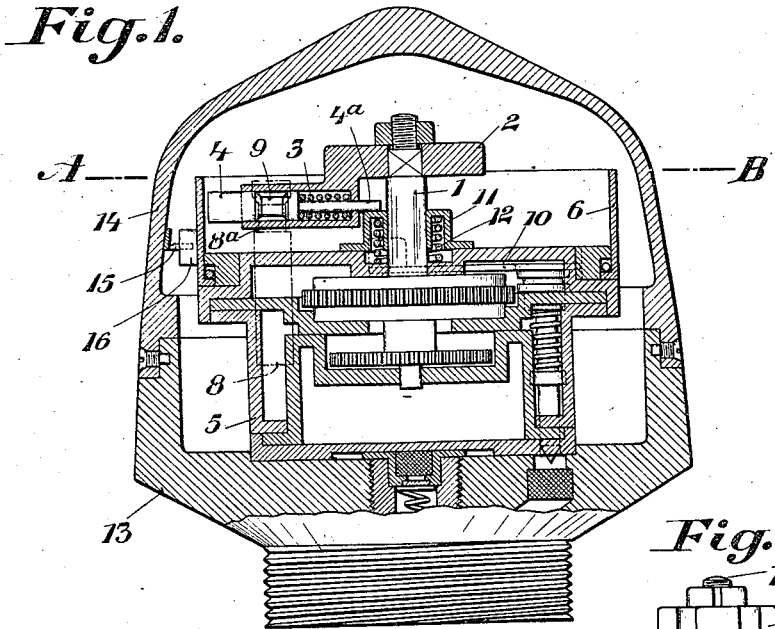
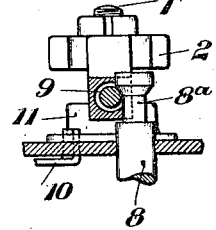
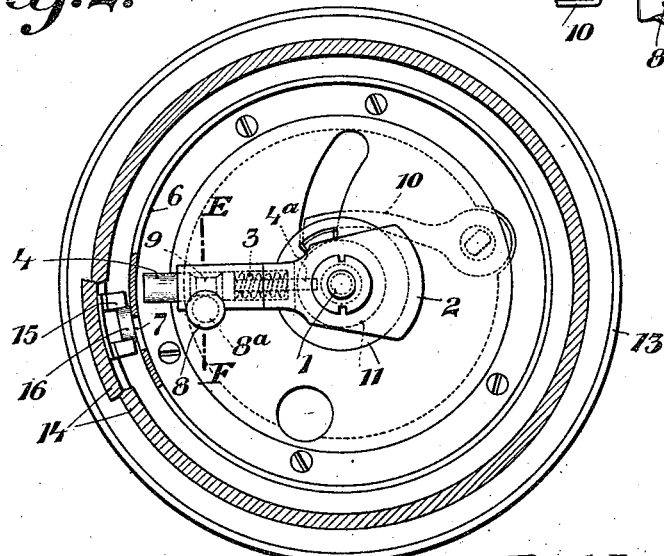
Inventor
Paul Liebergeld
By
James L. Norris
Attorney Sept. 11, 1928.

P. LIEBERGELD 1,684,354

MECHANICAL TIME FUSE WITH CLOCKWORK

Filed Oct. 6, 1927    2 Sheets-Sheet 2

Inventor
Paul Liebergeld
By
Attorney

Patented Sept. 11, 1928.

1,684,354

UNITED STATES PATENT OFFICE.

PAUL LIEBERGELD, OF BAD THAL, GERMANY.

MECHANICAL TIME FUSE WITH CLOCKWORK.

Application filed October 6, 1927, Serial No. 224,425, and in Germany October 8, 1926.

This invention relates to a mechanical time-fuse with clockwork and a ring designed to regulate the running time of the clockwork and rotatable with regard to the fuse-casing, said ring having an aperture for releasing the fuse. In fuses of known type a pointer is mounted on the main axle of the clockwork shiftable in longitudinal direction designed to come into engagement with the aperture of the ring for determining the time and bearing with friction on this ring when the clockwork is running off. Owing to the unavoidable clearance between the pointer and the axle of the clockwork, vibrations of the pointer occur, which influence unfavourably the accuracy of the releasing of the ignition. This inconvenience is avoided, according to the invention, by fixing the pointer rigidly on the axle of the clockwork and by mounting on the same a spring-controlled pointer-pin which after expiration of the predetermined ignition-time engages with the aperture of the ring for determining the ignition-time, whereby the ignition is released.

An embodiment of the invention is illustrated, by way of example, in the accompanying drawing which shows also an arrangement according to which the spring-controlled pointer-pin and the locking element of the locking for transport hold the one the other in the position for transport Fig. 1 shows in longitudinal section the fuse in the position for transport.

Fig. 2 is a section on line A—B of Fig. 1 viewed from above.

Fig. 3 is a section on line E—F of Fig. 2 viewed from the left.

Figure 4:
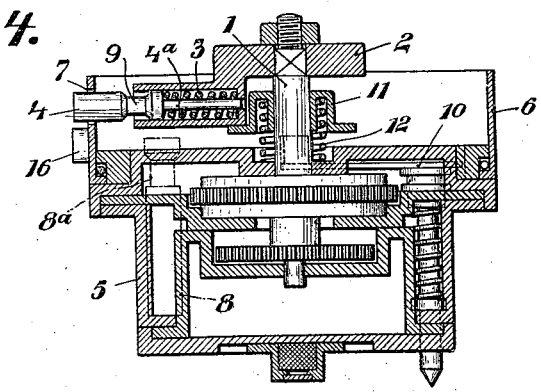
Fig. 4 shows a portion of a longitudinal section corresponding to that in Fig. 1, the elements being in the position after releasing the ignition, the ring for determining the time being in another angular position.
Figure 5:
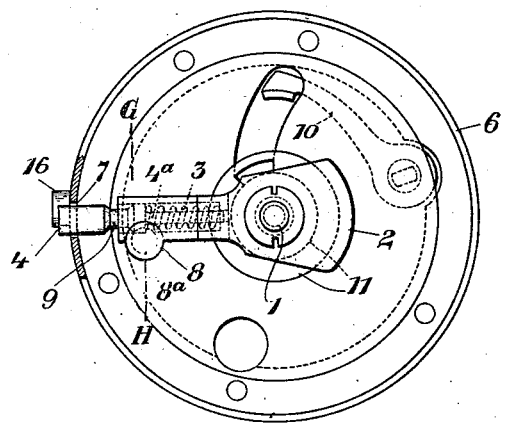
Fig. 5 is a top plan view of Fig. 4.
Figure 6:
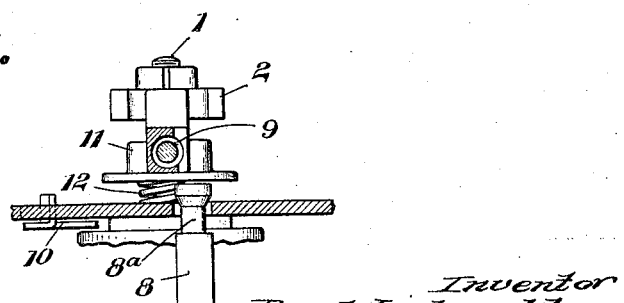
Fig. 6 is a section on line G—H of Fig. 5, viewed from the left.

The frame of the clockwork is fixed, in a manner known per se, in the fuse on the fuse-body 13, on which the outer adjusting cap 14 is rotatably mounted. In the pointer 2, rigidly mounted on the main axle 1 of the clockwork, a pointer-pin 4, controlled by a spring 3 is arranged so that it can be shifted in longitudinal direction. On the clockwork-frame 5 a ring 6 for determining the time, having an aperture 7, is rotatably mounted which, when the fuse is in the position for transport, is connected with the adjusting cap 14 by a clutch 15, 16 which is adapted to be automatically uncoupled when a shot is being fired. The pin 8, loosely mounted in the clockwork-frame 5 so that it can be shifted in longitudinal direction and serving for locking in the transport position, has an annular groove $8^a$ with which engages a set off portion 9 of the pointer-pin 4 under the action of the wound up clock-spring so that, as shown in Figs. 1 to 3, the pins 8 and 4 securely hold the one the other in the position for transport. During the firing the pin 8, which forms the locking element for the position for transport, assumes the position shown in Figs. 4 to 6, whereby the clockwork is released and the pointer-pin 4 liberated. During the running time of the clockwork the head of the pointer-pin 4 is pressed, by the pressure of spring 3, against the inner surface of the time determining ring 6. The shaft $4^a$ of the pointer-pin 4 rests then, same as when the fuse is in the state for transport, on a cap 11 which is spring-controlled and locks the ignition device 10. As soon as the pointer-pin 4 has assumed the angular position facing the aperture 7 of ring 8 in accordance with the adjusted time, the pointer-pin 4 jumps under the action of the spring 3, the pointer 2 being passing along the aperture 7, through this aperture so that it moves away from the cap A which, under the action of a spring 12, is pushed up and releases the fuse-mechanism 10 which is of a generally known construction so that the primer is struck.

I claim:—

1. A mechanical time-fuse with clockwork and with a ring for determining the fusing time rotatable with regard to the fuse-casing and having an aperture for releasing the fuse, comprising in combination with a main axle of the clockwork a pointer rigidly fixed on the main axle of said clockwork, a spring-controlled pointer-pin shiftably mounted in said pointer so that, when at the predetermined moment, it arrives at the aperture of said time-determining ring, it projects through this aperture and liberates the fuse-mechanism.

2. A mechanical time-fuse as specified in claim 1, a locking element for locking the time-fuse-mechanism in the position for transport, said locking element being held in its locking position by said pointer-pin.

3. In a mechanical time-fuse as specified in claim 1, a locking element for locking the time-fuse-mechanism in the position for transport, said locking element being held in its locking position by said pointer-pin and said pointer-pin being held in the locking position by said locking element.

4. A mechanical time-fuse as specified in claim 1, comprising in combination with the clockwork-frame and the pointer-pin having a set-off portion, a locking pin loosely mounted in said clockwork-frame so that it can be shifted in longitudinal direction and having an annular groove, and a clock-work-spring for holding said pointer-pin in such position that said set-off portion of said pointer-pin and said annular groove of said locking pin securely hold the one the other in the locking position for transport.

In testimony whereof I have hereunto set my hand.

PAUL LIEBERGELD.